R. B. POTTER.
GRADOMETER.
APPLICATION FILED FEB. 14, 1918.
1,393,314.
Patented Oct. 11, 1921.
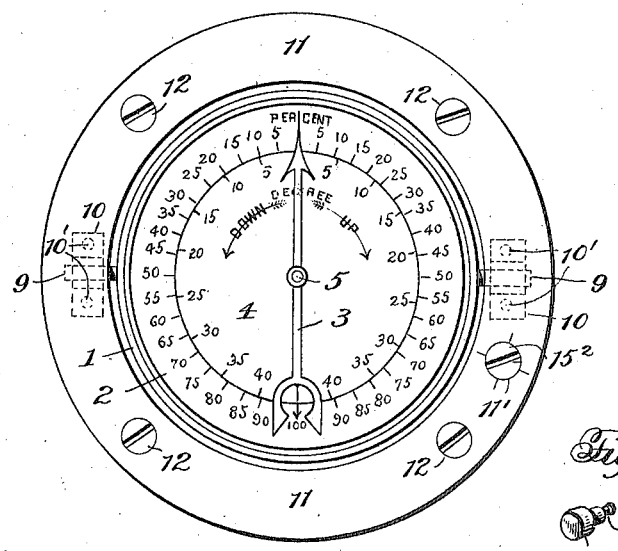
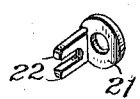
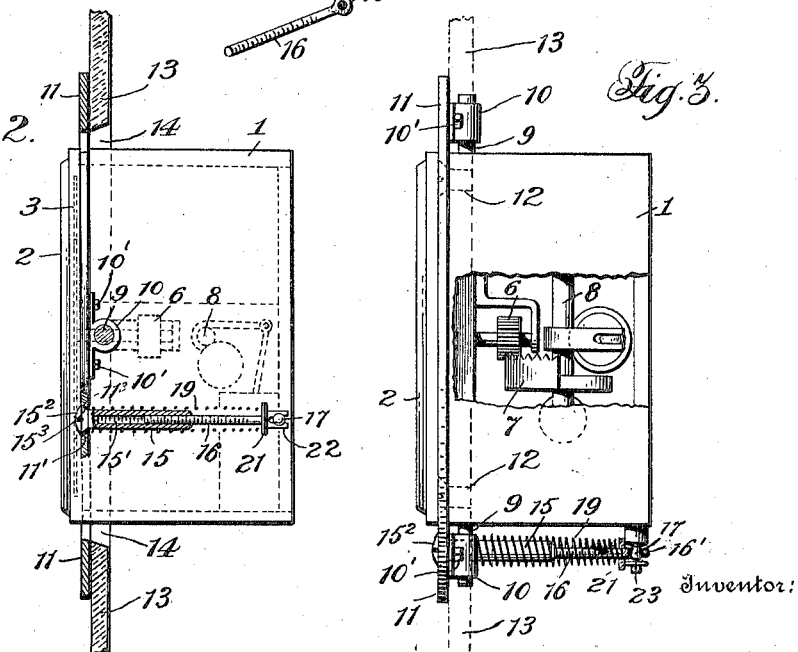
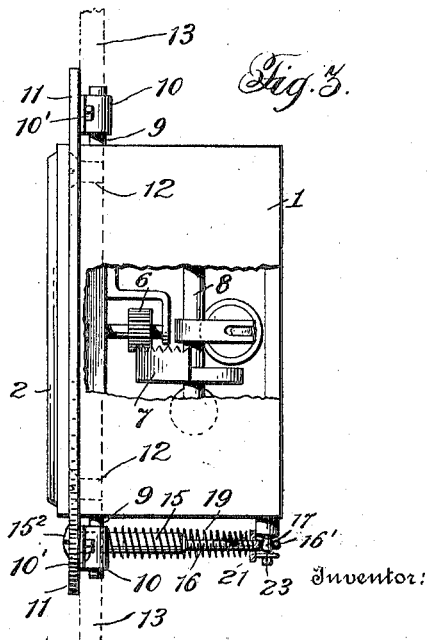
Witness:
Jas. E. Hutchinson
Inventor:
Rutherford B. Potter,
By Bacon & Milans
Attorneys

UNITED STATES PATENT OFFICE.

RUTHERFORD B. POTTER, OF BRIGHTON, COLORADO.

GRADOMETER.

1,393,314.  Specification of Letters Patent.  Patented Oct. 11, 1921.

Application filed February 14, 1918. Serial No. 217,090.

*To all whom it may concern:*

Be it known that I, RUTHERFORD B. POTTER, a citizen of the United States, residing at Brighton, in the county of Adams and State of Colorado, have invented certain new and useful Improvements in Gradometers, of which the following is a specification, reference being had therein to the accompanying drawing.

This invention relates to improvements in gradometers for use on automobiles, aeroplanes, and the like, and more particularly has to do with an improved mounting or means for attaching such devices to the dash or instrument board of the vehicle.

The object of the invention is to provide improved attaching means that provides for the mounting of gradometers upon the dash or instrument board with the front face of the gradometer substantially flush with the front face of the board, and which also provides for the adjustment of the gradometer relative to the instrument board for leveling the same.

A further object of the invention is to provide improved attaching means having the characteristics referred to that will be simple and inexpensive in construction, durable in use, and in which the leveling adjustment can be easily effected.

The invention, with other objects and advantages thereof, and the particular construction, combination and arrangement of parts comprising the same will be understood from the following detail description when considered in connection with the accompanying drawings forming part hereof and illustrating one embodiment of the invention.

In the drawings:

Figure 1 is a front elevation of a gradometer provided with attaching means in accordance with the invention.

Fig. 2 is a side elevation with parts shown in section, the device being illustrated attached to a vehicle dash board.

Fig. 3 is a top plan view, and

Figs. 4, 5 and 6 are detail views of parts of the adjusting means.

The invention comprehends the provision of a supporting frame or open plate structure, in which the gradometer casing or frame carrying the indicating mechanism is pivotally mounted for vertical tilting adjustment, and which is adapted to be secured to the instrument board at an opening therein, together with means carried by the supporting frame for adjusting the gradometer casing or frame relative to the supporting frame to level the same.

In the drawings, by way of example, I have illustrated a specific embodiment of the invention, the attaching means being shown in connection with the gradometer construction that forms the subject matter of my Patent No. 1,232,394. It will be understood, however, that my improved attaching means is adapted for use with various types of grade indicators, that the supporting frame or opening therein may be modified to suit other than cylindrical shaped gradometer casings or frames, and that other changes and variations in the particular construction shown and the carrying out of the invention in other forms as will appeal to those skilled in the art may be practised without departing from the spirit of the invention.

Referring to a detail description of the drawings, wherein like reference characters designate corresponding parts throughout the several views, 1 designates the gradometer casing provided with a glass front plate 2. 3 is the indicator hand or pointer movable over the dial plate 4, said indicator hand being secured to a shaft 5 that is connected by gears 6 and 7 with the pendulum or weight shaft 8.

In accordance with the present invention the gradometer casing 1 is provided at opposite sides thereof with trunnions or pivot pins 9 engaging bearings 10 at the sides of the supporting frame 11, said trunnions and bearings being disposed horizontally to provide for a limited vertical tilting adjustment of the gradometer casing relative to the frame 11 for leveling the same, the opening in the frame being of sufficient size to permit of such movement. In this particular instance the gradometer casing 1 is shown as cylindrical in form, and the supporting frame 11 provided with a correspondingly shaped opening, the supporting frame taking the form of a flat ring or annular plate.

The supporting frame or plate 11 is adapted to be secured by screws 12 flat against the front face of the dash or instrument board 13 at an opening 14 in the board. The bearings 10 are detachably secured to the rear face of the supporting frame or plate 11 by screws 10', and the trunnions or pivot pins 9 of the casing 1 are positioned near the forward end of the casing so that the casing is adapted to occupy a position with its glass front plate 2 extending substantially flush with the front face of the supporting plate 11 and the front face of the dash or instrument board.

As hereinbefore intimated, means is provided for effecting a vertical tilting adjustment of the gradometer casing 1 to accurately level the same and to maintain it in its adjusted position. The means for this purpose comprises an adjustable rod connection between the supporting plate 11 and the casing 1, said rod connection consisting of screw members 15—16 in telescopic engagement, one screw member 15, having an interiorly threaded tubular shank 15', and the other member 16 being exteriorly threaded and fitting within and in threaded engagement with the tubular shank 15' of the member 15. The screw member 15 has a head $15^2$ engaging the supporting plate 11 at the front side thereof, said member 15 extending rearwardly from the front face of the supporting plate 11 through an opening 11' in the plate, and the member 16 at its outer end has a bearing eye 16' loosely engaging a laterally projecting stud 17 on the gradometer casing 1 near the rear end thereof. The head $15^2$ of the screw member 15 has a rounded under face $15^3$ and the portion $11^3$ of the supporting plate 11 adjacent the opening 11' is rounded to permit the member 15 to swing vertically relative to the supporting plate in the adjustment of the gradometer casing about the pivots 10. Associated with the telescoping screw members 15—16 is a coiled spring 19 positioned about the members 15—16 with one end in engagement with the supporting plate 11 and its opposite end bearing against a washer 21 on the outer end portion of the screw member 16, said spring acting to maintain the head 15' of the screw member 15 in engagement with the front face of the supporting plate 11. The washer 21 loosely engages the screw member 16 and is provided with a bifurcated portion 22 extending from one side thereof. The opposite forks or sides of the bifurcated portion 21 engage grooves 23 in the stud 17, said bifurcated portion being held in engagement with the stud at one side of the bearing eye 16' of the screw member 16 by the coiled spring 19, and constituting means for retaining the bearing eye 16' in engagement with the stud.

As will be understood, by turning the screw member 15 in the ordinary way from the front side of the instrument board, the screw rod connection may be lengthened or shortened, and the adjustment of the gradometer casing 1 in a vertical plane about the pivots 10 easily effected.

It will be noted that the construction hereinbefore described is of a very simple, durable and inexpensive nature. The leveling adjustments can be conveniently effected and the gradometer casing is mounted substantially flush with the front face of the instrument board.

What I claim is:

1. The combination with a gradometer, of a mounting for the same comprising an open frame, means for connecting the gradometer casing with said frame to occupy a position with the front face thereof extending substantially flush with the front face of the frame and for adjusting movement of the gradometer casing relatively to the frame, and means for adjusting the gradometer casing relatively to the frame and for maintaining the gradometer casing in adjusted position, said adjusting means being operable from the front of the frame.

2. The combination with a gradometer, of a mounting therefor comprising an open frame, means for connecting the gradometer casing to the frame to occupy a position with the front face thereof extending substantially flush with the front face of the frame, and for pivotal adjustment in a vertical frame relatively to the frame, and means for adjusting the gradometer casing relatively to the frame, said means being operable from the front of the frame and comprising an adjustable screw rod connection between the frame and the gradometer casing, the screw rod connection having an operating head part extending to the front of the casing.

3. A device of the class described comprising in combination with gradometer indicating mechanism an open frame, a casing containing the gradometer indicating mechanism, said casing being pivotally mounted in the frame for pivotal movement in a vertical plane relatively to the frame, said frame being adapted to be connected to the instrument board of a vehicle, and means for adjusting the gradometer casing relatively to the frame and maintaining the same in adjusted position, said means comprising an adjustable rod connection between the supporting frame and the gradometer casing operable from the front of the supporting frame.

4. A device of the class described comprising in combination with gradometer indicating mechanism an open frame, a casing containing the gradometer indicating mechanism, said casing being pivotally mounted in the frame for pivotal movement in a vertical plane relatively to the frame, said frame being adapted to be connected to the instrument board of a vehicle, and means for adjusting the gradometer casing relatively to the frame and maintaining the same in adjusted position, said means comprising an adjustable rod connection between the supporting frame and the gradometer casing, the rod connection including telescopic screw members, one of said screw members having a head in loose fitting engagement with the supporting frame, and adapted to be turned to effect a lengthening or shortening of the rod connection and the adjustment of the gradometer casing.

5. A device of the class described comprising in combination with gradometer indicating mechanism an open frame, a casing containing the gradometer indicating mechanism, said casing being pivotally mounted in the frame for pivotal movement in a vertical plane relatively to the frame, said frame being adapted to be connected to the instrument board of a vehicle, and means for adjusting the gradometer casing relatively to the frame and maintaining the same in adjusted position, said means comprising telescopic screw members, one of said screw members being pivotally connected with the gradometer casing and the other screw member extending through an opening in the supporting frame and having a head loosely engaging the frame at the front face thereof, and a coiled spring on the screw members having one end in engagement with the supporting frame at the rear side thereof and its opposite end in engagement with a part on one of the screw members.

6. A device of the class described comprising in combination with gradometer indicating mechanism a substantially flat open frame, a casing containing the gradometer indicating mechanism, said casing being pivotally connected with the frame at its front part to occupy a position with the front face thereof extending substantially flush with the front face of said frame, and for pivotal adjustment in a vertical plane relatively to said frame, said frame being adapted to be connected to the instrument board of a vehicle, and means for adjusting the gradometer casing relatively to the frame and maintaining the same in adjusted position, said adjusting means comprising an adjustable rod connection pivotally connected at opposite ends respectively with the supporting frame, and with the gradometer casing near the rear portion thereof.

7. A device of the class described comprising in combination with gradometer indicting mechanism an open frame, a casing containing the gradometer indicating mechanism, said casing being pivotally mounted in the frame for vertical tilting adjustment relatively to the frame, said frame being adapted to be connected to the instrument board of a vehicle, and means for adjusting the gradometer casing relatively to the frame and maintaining the same in adjusted position, said means comprising telescoping screw members, a laterally projecting stud on the gradometer casing, one of the screw members being provided with a bearing eye loosely engaging the stud on the casing and the other screw member extending through an opening in the frame and loosely engaging the frame at the front face thereof, a washer loosely engaging the first mentioned screw member at the outer end portion thereof, a coiled spring on the screw member having one end in engagement with the supporting frame at the rear face thereof and its opposite end in engagement with said washer, the washer being provided with a lateral extension engaging a groove in the end portion of said stud and constituting retaining means for the bearing eye, said spring acting to maintain the washer in position with the laterally extending portion in engagement with the stud.

8. A device of the class described comprising in combination with gradometer indicating mechanism an open frame, a casing containing the gradometer indicating mecahnism, said casing being pivotally mounted in the frame for vertical tilting adjustment relatively to the frame, said frame being adapted to be connected to the instrument board of a vehicle, and means for adjusting the gradometer casing relatively to the frame and maintaining the same in adjusted position, said means comprising telescoping screw members, a laterally projecting stud on the gradometer casing, one of the screw members being provided with an eye loosely engaging the stud on the casing and the other screw member extending through an opening in the frame and loosely engaging the frame at the front face thereof, a washer loosely engaging the first mentioned screw member at the outer end portion thereof, a coiled spring on the screw members having one end in engagement with the supporting frame at the rear face thereof and its opposite end in engagement with said washer, said washer having a bifurcated laterally extending portion engaging grooves in the end portion of said stud and constituting retaining means for the eye, said spring acting to maintain the washer in position with its bifurcated extension in engagement with the stud.

9. A device of the class described, comprising in combination with gradometer indicating mechanism, an open frame, a casing containing the gradometer indicating mechanism the casing being pivotally mounted in the frame for vertical tilting adjustment relatively thereto, the frame being adapted to be connected to the instrument board of a vehicle, and means for adjusting the gradometer casing relatively to the frame and maintaining the same in adjusted position, said means comprising an adjustable rod comprising relatively adjustable end portions, a laterally projecting stud on the gradometer casing, one end portion of the adjustable rod being provided with an eye loosely engaging the stud on the casing and the other end portion extending through an opening in the frame and having a shoulder loosely engaging the frame of the front face thereof, a washer on the adjustable rod, said washer having a portion extending along side the eye of the adjustable rod, a coiled spring on the adjustable rod having one end in engagement with the supporting frame at the rear side thereof and its opposite end in engagement with said washer, the spring acting to maintain the washer in position with said portion thereof along side the eye of the adjustable rod, said portion constituting means for retaining the eye of the rod in engagement with the stud on the casing.

In testimony whereof I hereunto affix my signature in the presence of two witnesses.

RUTHERFORD B. POTTER.

Witnesses:
E. B. MOORE,
M. L. SOLQUIST.